United States Patent
Nakamura et al.

(10) Patent No.: US 6,964,431 B2
(45) Date of Patent: Nov. 15, 2005

(54) LOOP CORD SLIDE DEVICE FOR AIRBAG

(75) Inventors: Kenji Nakamura, Rochester Hills, MI (US); Michael J. Scavnicky, Northville, MI (US)

(73) Assignee: TK Holdings, Inc., Auburn Hill, MI (US)

( * ) Notice: Subject to any disclaimer, the term of this patent is extended or adjusted under 35 U.S.C. 154(b) by 0 days.

(21) Appl. No.: 10/261,371

(22) Filed: Sep. 30, 2002

(65) Prior Publication Data

US 2004/0061320 A1 Apr. 1, 2004

(51) Int. Cl.$^7$ ............................................ B60R 21/16
(52) U.S. Cl. ........................................................ 280/743.2
(58) Field of Search ........................ 280/743.2, 730.1, 280/730.2, 733, 743.1

(56) References Cited

U.S. PATENT DOCUMENTS

| | | | |
|---|---|---|---|
| 3,687,485 A | 8/1972 | Campbell | 280/150 |
| 5,232,244 A | 8/1993 | Itoh | 280/749 |
| 5,265,903 A | 11/1993 | Kuretake et al. | 280/730 |
| 5,333,898 A | 8/1994 | Stutz | 280/730 |
| 5,462,308 A | 10/1995 | Seki et al. | 280/749 |
| 5,588,672 A | 12/1996 | Karlow et al. | 280/730.2 |
| 5,660,414 A | 8/1997 | Karlow et al. | 280/749 |
| 6,000,715 A * | 12/1999 | Tschaeschke | 280/730.2 |
| 6,099,029 A | 8/2000 | Haland et al. | 280/729 |
| 6,135,490 A * | 10/2000 | Spary | 280/730.2 |
| 6,149,195 A * | 11/2000 | Faigle | 280/749 |
| 6,168,191 B1 | 1/2001 | Webber et al. | 280/730.2 |
| 6,168,193 B1 | 1/2001 | Shirk et al. | 280/730.2 |
| 6,168,194 B1 | 1/2001 | Cuevas et al. | 280/730.2 |
| 6,176,515 B1 | 1/2001 | Wallner et al. | 280/730.2 |
| 6,203,058 B1 | 3/2001 | Elqadah et al. | 280/730.2 |
| 6,237,939 B1 | 5/2001 | Resh | 280/730.2 |
| 6,237,943 B1 * | 5/2001 | Brown et al. | 280/730.2 |
| 6,241,277 B1 | 6/2001 | Heigl et al. | 280/730.2 |
| 6,347,807 B1 * | 2/2002 | Schink et al. | 280/730.2 |
| 6,454,296 B1 * | 9/2002 | Tesch et al. | 280/730.2 |

* cited by examiner

Primary Examiner—Faye M. Fleming
(74) Attorney, Agent, or Firm—Raggio & Dinnin, P.C.

(57) ABSTRACT

An inflatable restraint device for a vehicle is provided that includes an inflatable restraint cushion stored along a roof rail of a vehicle window in an undeployed state. A flexible loop is provided that is integral with the cushion, and an elongate cord member with a first end and a second end, the cord passing through the loop. The flexible loop slidably engages the cord during deployment of the inflatable restraint cushion, and supplies a tensioning force to the cushion.

21 Claims, 3 Drawing Sheets

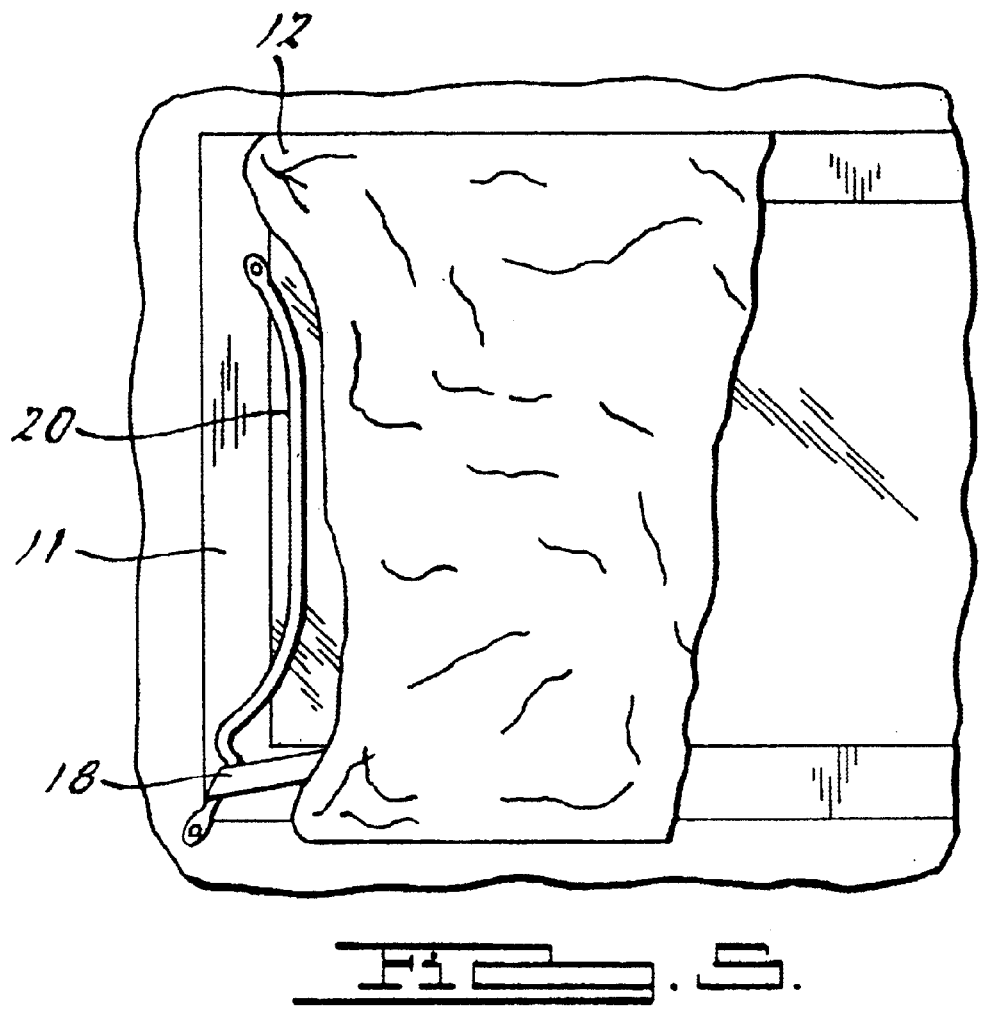

LOOP CORD SLIDE DEVICE FOR AIRBAG

TECHNICAL FIELD

The present invention relates generally to side-mounted inflatable restraint devices, and more particularly to such a device incorporating a flexible tether slidably connecting the inflatable cushion to an elongate member.

BACKGROUND OF THE INVENTION

Supplemental restraint devices have become commonplace in vehicles in recent years and engineering and design efforts have increasingly focused on such devices deployable along vehicles' interior sides. In the event of a side impact or vehicle rollover event, a curtain or inflatable cushion is rapidly positioned between the vehicle passenger and the window/door of the vehicle. Due to the limited vehicle structure that separates an occupant from a rapidly moving body impacting the side of the vehicle, occupants may sustain much greater injuries in side-impact events than front or rear impacts. The energy absorbed by the vehicle structure tends to be substantially less than the energy which may be absorbed in front-end or rear-end collisions. Moreover, the forces generated in side-impact or vehicle rollover events may actually cause the occupant to be ejected from the side of the vehicle. Some vehicles, due to their structure as well as a possible increased rollover risk, present particular problems in this area.

Various mounting methods and restraint apparatus configurations have been developed to assist in protecting occupants during such events. One approach has been to position a deflated or folded restraint cushion or curtain behind a trim panel located along the vehicle roof rail. When deployment is desired, the deploying restraint can burst through or push aside the trim panel, ultimately being positioned adjacent the occupant, where it absorbs impact from the occupant's head and torso. Where inflatable cushions are used, however, the necessarily rapid rate of inflation, coupled with the consequences of an occupant striking the deployed cushion, can sometimes present difficulties to maintaining the cushion between the occupant and the window/door of the vehicle. For example, an initial striking of the cushion by the occupant may cause the cushion to bounce out of its operative position, creating a risk that the occupant could strike the window or door upon being thrown toward the door a second time. In a severe crash, where a vehicle rolls multiple times, this scenario may present multiple opportunities for the occupant's injury. In addition to the problems of maintaining the cushion in an operative position throughout an accident sequence, the impact of an occupant on the cushion may actually displace the cushion through the vehicle window. Maintaining the effective position of the side airbag has proven challenging. Accordingly, engineers have developed a variety of tethering and mounting schemes to support the cushion during deployment. Many of these systems, however, are relatively complex and bulky. In addition, the rigid components can be difficult to package in the limited space available behind a trim panel.

SUMMARY OF THE INVENTION

An inflatable restraint device for a vehicle is provided that includes an inflatable restraint cushion stored along a roof rail of a vehicle window in an undeployed state. A flexible loop is also provided, the flexible loop being integral with the cushion, and an elongate cord or bar member having a first end attached to the vehicle proximate a first corner of the window, and a second end attached to the vehicle proximate a second corner of the window, the elongate cord or bar member extending through said loop guide. The flexible loop is movable over the elongate cord member during deployment of the cushion, an interface of the loop guide and the member providing a tensioning force to the cushion.

BRIEF DESCRIPTION OF THE DRAWINGS

FIG. 5 illustrates an embodiment of a bent rod member adapted to assist in retaining a loop.

DETAILED DESCRIPTION

Figure 1:
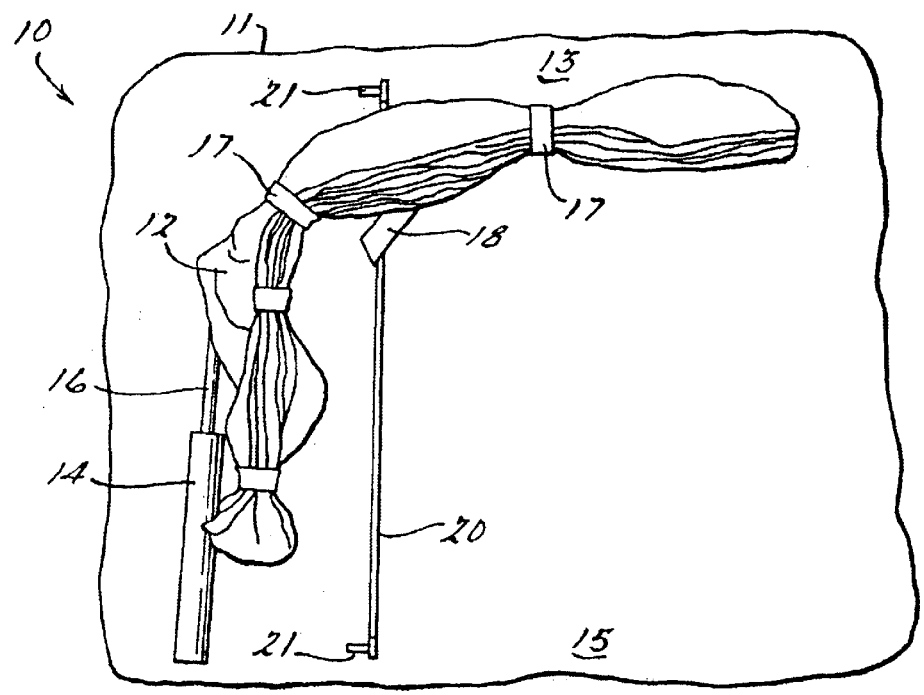
FIG. 1 illustrates an inflatable restraint device in an undeployed condition according to a preferred embodiment of the present invention.
Figure 2:
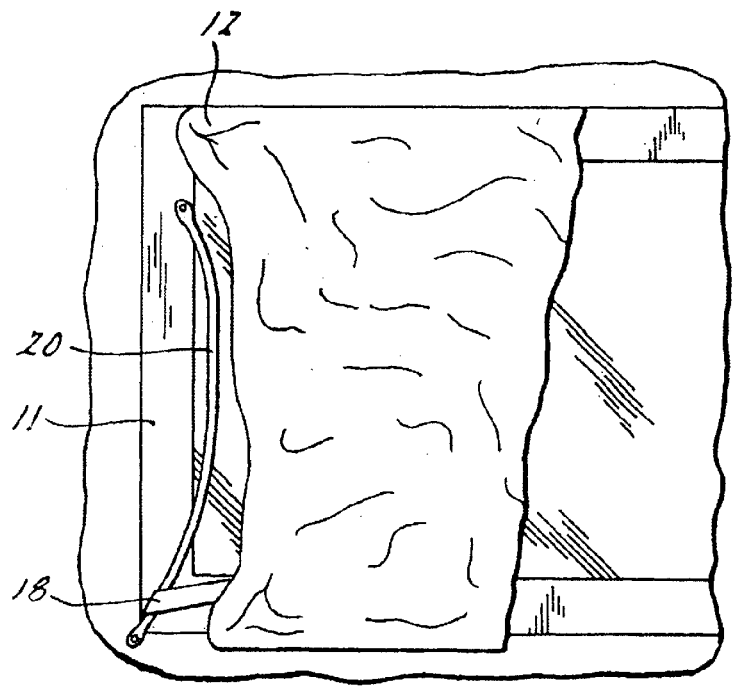
FIG. 2 is a partial view of a device similar to FIG. 1, wherein the device is shown in a deployed condition.

Referring to the accompanying drawing Figures, an inflatable restraint device 10 for a motor vehicle is shown. Device 10 includes a housing 11, preferably comprising a conventional frame surrounding a side window opening, and an inflatable restraint cushion 12 secured to housing 11. An inflator 14 is provided, preferably a conventional pyrotechnic inflator, and is operable to supply gas for inflation/deployment of restraint cushion 12 via a tube 16. An elongate cord member 20, preferably flexible, is affixed with a bracket 21 at an upper portion 13 of housing 11, and at a lower portion 15 of housing 11, also preferably with a bracket 21. While the present embodiments have been described with respect to an embodiment incorporating a flexible cord, it should be appreciated that embodiments utilizing a more rigid cord or rod are contemplated. Thus, as used herein "cord" refers to both flexible and inflexible members. It should also be appreciated that the terms "upper" and "lower" portions of the housing preferably refer to upper and lower corners of the vehicle window, respectively, but are not thereby limiting. A loop 18, preferably flexible, is integral with cushion 12, and slidably engages cord 20 during deployment. Cushion 12 is preferably stored along the roof of the associated vehicle, for example, along the vehicle roof rail (not shown) above a window, in a conventional manner. Cushion 12 is preferably secured in a folded state beneath a piece of trim (not shown). A plurality of breakable ties 17 may be used to secure cushion 12 beneath the trim panel, however, in a preferred embodiment the trim panel is snapped, screwed, or otherwise secured in place over the packed, folded cushion. For illustrative purposes, FIG. 1 shows cushion 12 in a relatively loosely packaged condition. It should be appreciated that the tightness with which cushion 12 is packaged may vary, depending on the space constraints, relative size of the cushion selected, and deployment characteristics. In a preferred embodiment, cushion 12 is packaged relatively tightly behind the associated trim panel. The loop 18, cord 20, cushion 12 and any associated packing materials are all preferably constructed from relatively flexible materials, allowing the entire system to be packaged and stored adjacent to or within the vehicle roof relatively easily. The chosen scale and arrangement of the present illustration is merely for clarity of description. The various elements of device 10 are all formed from known materials and by known processes.

Figure 3:
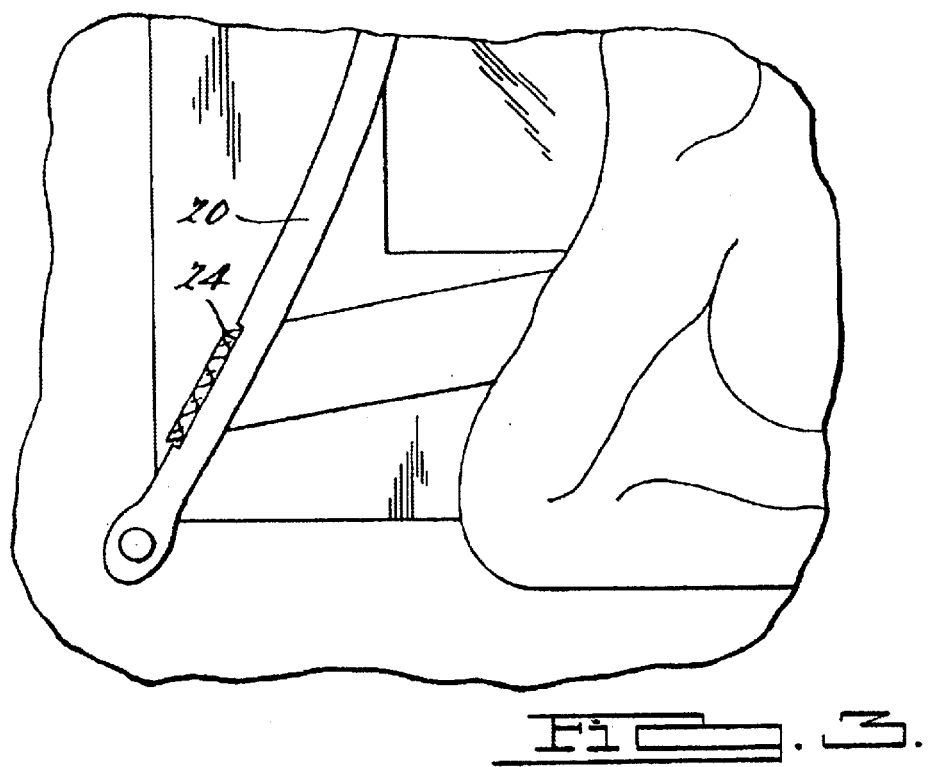
FIG. 3 is a partial close-up view of a second preferred embodiment of the present invention.
Figure 4:
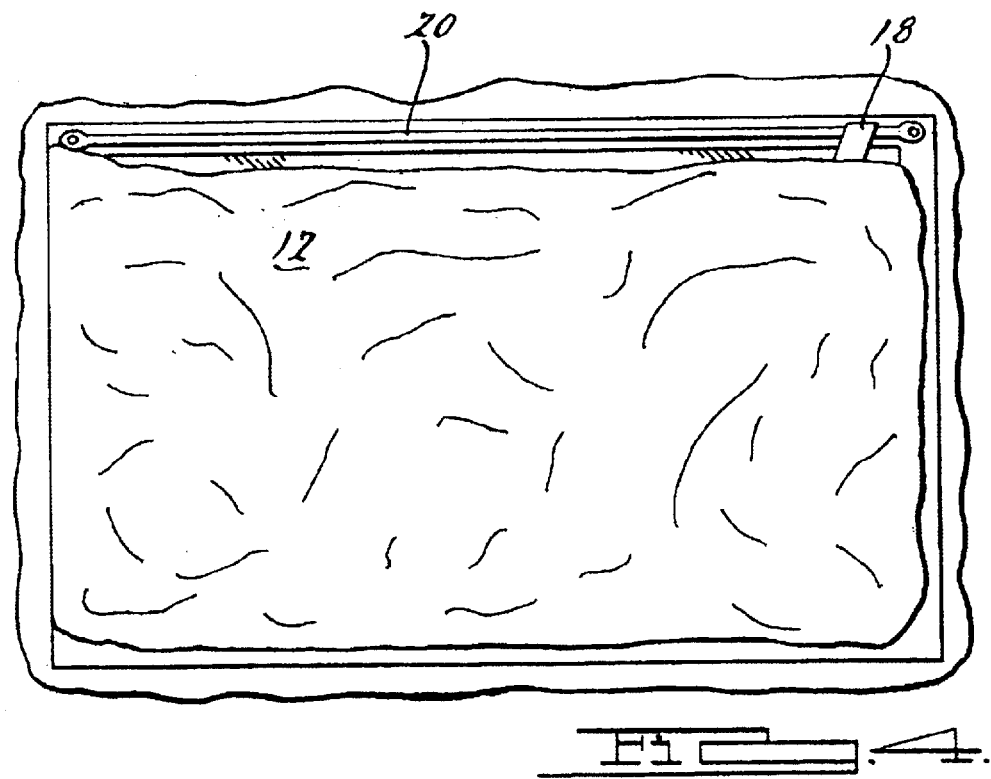
FIG. 4 illustrates a third preferred embodiment of the present invention.

When deployment of cushion 12 is desired, for example, during a vehicle crash or rollover event, inflator 14 is activated to supply pressurized gas in a conventional manner for inflation of cushion 12. As the force of inflation gas inside cushion 12 expands the cushion, it is driven away from its storage position. As the cushion moves outward, preferably downward from the roof rail, the expanding cushion is guided by loop 18, as it slides along cord 20. Once fully deployed, the tendency of cushion 12, now filled with inflation gas, to pull away from cord 20 is resisted by loop 18. Thus, cooperation between loop 18 and cord 20 during deployment assists in both positioning and tensioning cushion 12, and provides lateral support thereto. FIG. 3 shows an alternative embodiment in which a portion of cord 20, proximate lower portion 15 of housing 11, defines a notch 24 that, when engaged with loop 18, prevents loop 18 from sliding in an upward direction along cord 20. When sufficient gas has flowed into cushion 12 such that it can begin to expand, the inflating cushion bursts ties 17, and displaces or bursts through the overlaying trim member. In a preferred embodiment, cord 20 is aligned substantially parallel to the direction of inflation of cushion 12, preferably a downward direction relative to the vehicle roof rail. Cord 20 is preferably located behind a vehicle trim panel and, for example, may be affixed to the vehicle B, C, or D pillar. Loop 18 is integral with cushion 12, preferably stitched thereto, and encircles cord 20. Loop 18 comprises a closed loop of preferably substantially flat, flexible material. Loop 18 may be formed from a conventional textile material, or formed from some other suitable material such as nylon webbing, etc. In a preferred embodiment, loop 18 is affixed to cushion 12 proximate a lower corner, however, it might be alternatively positioned for other applications, for instance along the side or bottom edge of the cushion, away from the corner. Deployment of cushion 12 preferably results in cushion 12 descending downward from the vehicle roof rail. During the descent of cushion 12, loop 18 slidably engages cord 20, assisting in properly positioning cushion 12, and providing lateral support. In the FIG. 3 embodiment, notch 24 assists in preventing loop 18, and consequently cushion 12, from being forced away from the preferred deployed position. Referring to FIG. 5, in embodiments utilizing a relatively more rigid cord/rod 20, the rod member itself may be bent rather than notched to assist in retaining loop 18. During a crash or rollover event, an occupant's head or other part of their body may strike the cushion, giving it a tendency to dislodge. The interface of loop 18 with cord 20, by providing a tensioning force on cushion 12, prevents the cushion from being displaced either by the occupant or due to inertial forces from the crash or rollover. Thus, by utilizing the present invention, cushion 12 is more likely to remain in its proper deployed position during a crash or rollover event than in conventional systems. In a preferred embodiment, cord 20 is mounted rearward of the associated vehicle window, however, embodiments are contemplated in which the cord is mounted at a front side of the vehicle window, or where a plurality of cord-loop combinations are utilized with a single cushion. In an embodiment wherein cushion 12 is deployed in a frontward or rearward direction, cord 20 may be affixed to the vehicle door itself, or along the vehicle roof, as shown in FIG. 4.

Various embodiments are contemplated in which variations in the flexibility and elasticity of cord 20 and loop 18 are combined with one another. It should be appreciated that cord 20 might be made from a variety of materials, having different properties. A piece of nylon rope might be used, or a piece of plastic coated steel cable, for instance. In certain applications, it may be desirable to use a more or less flexible cord 20, ranging from the aforementioned flexible rope to a relatively inflexible rod. Similarly, it may be desirable to use cords having greater or lesser tension applied along their length. During installation in a vehicle, cord 20 might be stretched between its brackets 21 until taut, then secured. The tightened cord could impart greater tension to cushion 12 upon deployment than a relatively slack cord. Similar variations in flexibility and structure are also possible with loop 18. Embodiments are contemplated in which a piece of substantially inelastic nylon is used to form loop 18. Alternatives might employ a loop formed from a relatively elastic material, such as a polypropylene, rubber or textile, either in combination or alone. In such an embodiment, the loop could be deformed in a longitudinal direction, along its length, as well as foldably deformable for facilitating storage behind the trim panel. Still further, the materials of loop 18 and cord 20 may be selected according to the frictional interaction between the two during deployment of cushion 12. For example, a relatively rough interface might be desirable where maximization of resistance to sliding is desired, or a relatively smooth interface where greater sliding speed is desirable, or less force is available to initiate sliding between loop 18 and cord 20.

Varying applications may also make alternative alignments of cord 20 desirable. Cord 20 need not be oriented parallel to the direction of the deployment of cushion 12. Rather, it might be positioned at an angle relative to the deployment direction to increase or decrease tension provided to the cushion from the interface of cord 20 and loop 18 as loop 18 slides down cord 20 during deployment.

It should be appreciated that the present description is for illustrative purposes only, and should not be construed to limit the breadth of the present invention in any way. Thus, those skilled in the art will appreciate that various modifications might be made to the presently disclosed embodiments without departing from the intended spirit and scope of the present invention, which is defined in terms of the claims set forth below. Other aspects, features, and advantages will become apparent upon an examination of the attached drawing figures and appended claims.

What is claimed is:

1. An inflatable restraint device for a vehicle having a side window, said restraint device stored in an undeployed state adjacent said window, comprising:
   an inflatable restraint cushion;
   a flexible loop integral with said cushion;
   an elongate cord member, said member having a first end attached to said vehicle proximate a first corner of said window, and a second end attached to said vehicle proximate a second corner of said window, said elongate cord member extending through said flexible loop;
   said flexible loop slidably engages said elongate cord member during deployment of said cushion, an interface of said flexible loop with said member providing a tensioning force to said cushion, wherein said elongate chord member comprises a bend that is adapted to assist in retaining said flexible loop.

2. The restraint device of claim 1 wherein said flexible loop is formed from a textile.

3. The restraint device of claim 1 wherein said flexible loop is formed from a non-textile.

4. The restraint device of claim 1 wherein said flexible loop is elastically deformable, said loop having a substantially two dimensional inner surface engaging with said cord.

5. The restraint device of claim 1 wherein said elongate cord member is substantially rigid.

6. The restraint device of claim 1 wherein said elongate cord member is flexible.

7. The restraint device of claim 1 wherein said elongate cord member defines a notch proximate said second end and;
   wherein said flexible loop slides into engagement with said notch, thereby fixing said inflatable restraint against displacement.

8. A restraint device deployable along a side window of a vehicle, said window having a first side and a second side, the restraint device comprising:
   an inflatable restraint cushion, said cushion stored at the roof of the vehicle in an undeployed state;
   a notched elongate cord member, said member having a first end and a second end, wherein said first end is attached to the vehicle proximate an upper corner of the second side of said window, and said second end is attached to the vehicle proximate a lower corner of the second side of said window;
   a flexible, foldable loop integral with said cushion and extending from a periphery thereof, said flexible, foldable loop slidably engaging said elongate cord member upon cushion deployment, and said flexible, foldable loop engaging a notch in said cord member to prevent travel of said flexible, foldable loop along said cord member, wherein said notched elongate chord member comprises a bend that is adapted to assist in retaining said flexible, foldable loop.

9. The restraint device of claim 8 wherein said first side of the window is a front side, and said second side of the window is a rear side.

10. The restraint device of claim 8 wherein said first side of the window is a rear side, and said second side of the window is a front side.

11. An inflatable restraint device comprising:
    a housing having an upper portion and a lower portion;
    an inflatable cushion stored in said housing in an undeployed state;
    a flexible loop integral with said cushion;
    an elongate member having ends fixed relative to said cushion, a first end attached at said upper portion of said housing, and a second end attached at said lower portion of said housing, said elongate member extending through said flexible loop; wherein
       upon deployment of said cushion, said flexible loop slidably engages said elongate member, tensioning said cushion, wherein said elongate chord member comprises a bend that is adapted to assist in retaining said flexible loop.

12. The inflatable restraint device of claim 11 wherein said loop is elastically deformable in a longitudinal direction.

13. The inflatable restraint device of claim 11 wherein said elongate member is flexible.

14. The inflatable restraint device of claim 11 wherein said elongate member is relatively rigid.

15. The inflatable restraint device of claim 14 wherein said elongate member includes a notched portion for receipt of said loop.

16. An inflatable restraint device for a vehicle having a side window, said restraint device stored in an undeployed state adjacent said window, comprising:
    an inflatable restraint cushion;
    a flexible loop integral with said cushion, said flexible loop being elastically deformable;
    an elongate cord member, said member having a first end attached to said vehicle proximate a first corner of said window, and a second end attached to said vehicle proximate a second corner of said window, said elongate cord member extending through said flexible loop;
    said flexible loop slidably engages said elongate cord member during deployment of said cushion, an interface of said flexible loop with said member providing a tensioning force to said cushion, wherein said elongate chord member comprises a bend that is adapted to assist in retaining said flexible loop.

17. The restraint device of claim 16 wherein said elongate cord member is flexible.

18. An inflatable restraint device comprising:
    a housing having an upper portion and a lower portion;
    an inflatable cushion stored in said housing in an undeployed state;
    an elongate flexible loop integral with said cushion and elastically deformable in a longitudinal direction;
    an elongate member having ends fixed relative to said cushion, a first end attached at said upper portion of said housing, and a second end attached at said lower portion of said housing, said elongate member extending through said elongate flexible loop;
    wherein upon deployment of said cushion, said elongate flexible loop slidably engages said elongate member, tensioning said cushion, and said elongate member comprises a bend that is adapted to assist in retaining said elongate flexible loop.

19. The restraint device of claim 18 wherein the elongate member is substantially rigid.

20. The restraint device of claim 18 wherein the elongate member comprises a notch adapted to receive said loop.

21. An inflatable restraint device for a vehicle having a side window, said restraint device stored in an undeployed state adjacent said window, comprising:
    an inflatable restraint cushion;
    an elongate cord member, said member having a first end attached to said vehicle proximate a first corner of said window, and a second end attached to said vehicle proximate a second corner of said window;
    a flexible loop attached to said cushion and extending about said flexible cord member, said loop formed from a substantially flat material having an inner surface frictionally engageable against said cord member;
    said flexible loop slidably engages said elongate cord member during deployment of said cushion, an interface of said flexible loop with said member during deployment providing a tensioning force to said cushion.

* * * * *